United States Patent [19]
Tanaka et al.

[11] Patent Number: 4,978,707
[45] Date of Patent: Dec. 18, 1990

[54] AQUEOUS DISPERSION AND PROCESS FOR PREPARATION THEREOF

[75] Inventors: Mutsuhiro Tanaka; Shiro Honma, both of Otake, Japan

[73] Assignee: Mitsui Petrochemical Industries, Ltd., Tokyo, Japan

[21] Appl. No.: 15,223

[22] Filed: Feb. 17, 1987

[30] Foreign Application Priority Data

Apr. 24, 1986 [JP] Japan .................................. 61-93374

[51] Int. Cl.$^5$ ............................................. C08L 51/00
[52] U.S. Cl. .................................... 524/504; 524/500; 524/515; 524/517; 524/522; 524/523; 524/525; 524/527; 524/502
[58] Field of Search ............... 524/500, 502, 504, 517, 524/522, 523, 527, 515, 525

[56] References Cited

U.S. PATENT DOCUMENTS 4,174,335  11/1979  Ohdaira et al. ............ 260/29.6 RW Primary Examiner—Joseph L. Schofer
Assistant Examiner—J. M. Reddick
Attorney, Agent, or Firm—Sherman and Shalloway

[57] ABSTRACT

Disclosed is an aqueous dispersion comprising (i) a hydrophobic thermoplastic polymer, (ii) a water-insoluble thermoplastic polymer containing a carboxylic acid salt group bonded to the polymer chain at a concentration of 0.1 to 5 milliequivalents as —COO— per gram of the polymer, (iii) water and, if necesssary, (iv) at least one member selected from the group consisting of anionic surface active agents, nonionic surface active agents, organic solvents and oils, said aqueous dispersion being apparently solid and having a water content of 0.5 to 3% by weight and an electric resistance lower than $10^6$ Ω-cm and also having such a property that when water is added to the dispersion, solids are uniformly dispersed as fine particles in the aqueous phase.

20 Claims, 1 Drawing Sheet

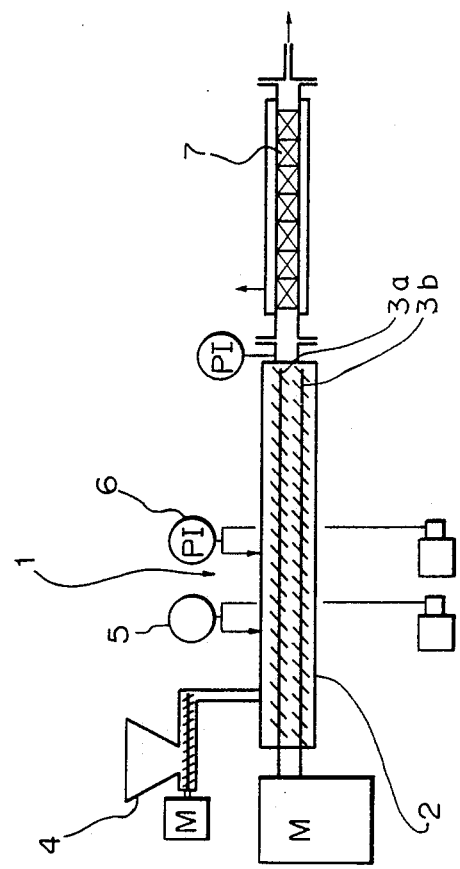
Fig. I

AQUEOUS DISPERSION AND PROCESS FOR PREPARATION THEREOF

Background of the Invention

(1) Field of the Invention

The present invention relates to an aqueous dispersion of a resin and a process for the preparation thereof. More particularly, the present invention relates to an aqueous dispersion which has such a property that a resin is uniformly dispersed in the form of fine particles in the aqueous phase, though the dispersion is an apparently solid composition having a very low water content, and a process for the preparation of this aqueous dispersion.

(2) Description of the Prior Art

Various aqueous dispersions of polymers are known. For example, flowable aqueous dispersions having a water content higher than about 30% (hereinafter referred to as "flowable aqueous dispersion") are coated and dried on surfaces of molded plastic articles, woods and metals to form resin films and impart water resistance, oil resistance and chemical resistance to the substrates or they are used as heat sealants. Since water is used as the dispersion medium in these flowable aqueous dispersions, they are advantageous over solvent type dispersions in reduced liability to cause ignition or environmental pollution and easiness of handling, and they are widely used in various fields.

Furthermore, apparently solid aqueous dispersions having no flowability (hereinafter referred to as "solid aqueous dispersion") are known as well as the above-mentioned flowable aqueous dispersions. Namely, these solid aqueous dispersions are powdery and known as powdery emulsions, and if water is added to these solid aqueous dispersions, they are re-dispersed in water to form flowable aqueous dispersions. These solid aqueous dispersions hardly contain water, and if water is contained, the water content is 2 to 3% by weight at highest. Accordingly, there is not risk of freezing even at low temperatures and they are advantageous in that packaging or transportation is simplified and it is possible to narrow the storage space. Furthermore, the solid aqueous dispersions can be directly mixed with powders or granules which dislike the contact with water, such as cement, mortar and gypsum, though this mixing is very difficult in case of flowable aqueous dispersions, and therefore, compounded products having a high degree of processing can be prepared.

The solid aqueous dispersions are prepared by once forming aqueous dispersions having a high water content according to known methods and spraying the aqueous dispersions in hot air in a furnace by a sprayer to evaporate water and obtain powders.

In Japanese Patent Application No. 153039/84, we proposed an aqueous dispersion comprising (i) a hydrophobic thermoplastic resin, (ii) a water-insoluble and water-non-swelling thermoplastic polymer containing a carboxylic acid salt group bonded to the polymer chain at a concentration of 0.1 to 5 millimole equivalents as

per gram of the polymer and (iii) water, which is apparently solid and has a water content of 3 to 25% by weight and has such a property that when water is added, the solids are uniformly dispersed in the aqueous phase. This solid aqueous dispersion is prepared according to the method in which the above-mentioned components or precursors thereof are melt-kneaded in an extruder.

In the former drying method for preparing a solid aqueous dispersion, agglomeration of polymer particles is caused at the spraying step or the formed powdery emulsion is aggregated under the action of heat or pressure to form large particles. If water is added to this powdery emulsion for re-dispersion, no good dispersion state is attained or the viscosity is increased to degrade the physical properties of the formed coating. Accordingly, an additive such as an anti-tack agent or a protecting colloid is added to the aqueous dispersion before spraying or the powder before drying. However, no substantial effect is attained if the additive is not added in a large amount, and if the additive is added in a large amount, the physical properties of the coating are degraded. Moreover, since water contained at a high content is evaporated, the energy loss is increased and the method is not advantageous from the economical viewpoint. Therefore, development of a technique of preparing a solid aqueous dispersion such as a powdery emulsion with a reduced energy loss without using an additive is desired.

The latter method proposed by us is advantageous in that a solid aqueous dispersion can be directly prepared with a relatively small amount of water without such an operation as drying, but the method is still insufficient in that the particle size of the dispersed resin component is relatively large and in the order of microns.

Accordingly, development of a solid aqueous dispersion in which the water content is as low as possible and the resin solids are dispersed in the aqueous phase as uniformly and finely as possible when water is added is eagerly desired in the art. Moreover, development of a process in which a solid aqueous dispersion as mentioned above can be directly prepared without such means as concentration and drying.

SUMMARY OF THE INVENTION

We found that when (i) a hydrophobic thermoplastic polymer, (ii) a water-insoluble and non-water-swelling thermoplastic polymer containing a carboxylic acid or carboxylic acid salt group bonded to the polymer chain and (iii) water are melt-kneaded according to the method previously proposed by us, if the polymer (i) is melt-kneaded with the polymer (ii) in advance, water optionally together with a basic substance is added to a space portion between a screw and a barrel in an extruder, which is substantially filled with the melt, and melt-kneading of the mixture is further conducted, there is obtained an aqueous dispersion in which water is present as the continuous phase and the polymers are present as the phase of dispersed particles with such a low water content as not exceeding 3% by weight. We have now completed the present invention based on this finding.

More specifically, in accordance with one fundamental aspect of the present invention, there is provided an aqueous dispersion comprising (i) a hydrophobic thermoplastic polymer, (ii) a water-insoluble thermoplastic polymer containing a carboxylic acid salt group bonded to the polymer chain at a concentration of 0.1 to 5 milliequivalents as —COO— per gram of the polymer, (iii) water and, if necessary, (iv) at least one member selected from the group consisting of anionic surface active agents, nonionic surface active agents, organic solvents and oils, said aqueous dispersion being apparently solid and having a water content of 0.5 to 3% by weight and an electric resistance lower than $10^6$ Ω-cm and also having such a property that when water is added to the dispersion, solids are uniformly dispersed as fine particles in the aqueous phase.

In accordance with another fundamental aspect of the present invention, there is provided a process for the preparation of an aqueous dispersion, which comprises mixing in an extruder (i) a melt comprising (i) a hydrophobic thermoplastic polymer, (ii) a water-insoluble thermoplastic polymer containing a carboxylic acid or carboxylic acid salt group bonded to the polymer chain at a concentration of 0.1 to 5 millimole equivalents as —COO— per gram of the polymer or a carboxylic acid derivative group capable of producing said group at said concentration by a base treatment and, if necessary, (iii) at least one member selected from the group consisting of anionic surface active agents, organic compounds capable of being converted to anionic surface active agents by a base treatment, nonionic surface active agents, organic solvents and oils with (iv) water and (v) a basic substance in the case where a thermoplastic polymer (ii) or organic compound requiring a base treatment is present, continuously in a state where a back pressure is applied to the melt, and subsequently melt-kneading the mixture to cause the phase inversion and form an aqueous dispersion of polymer solids.

BRIEF DESCRIPTION OF THE DRAWINGS

FIG. 1 is a side view illustrating the arrangement of a kneading apparatus used in carrying out the process of the present invention.

In the drawings, reference numeral 1 represents an extruder, reference numeral 2 represents a barrel, each of reference numerals 3a and 3b represents a screw, reference numeral 4 represents a hopper, reference numeral 5 represents a supply opening, reference numeral 6 represents a water supply opening, and reference numeral 7 represents a cooling device.

DETAILED DESCRIPTION OF THE PREFERRED EMBODIMENTS

The present invention is based on the finding that when a hydrophobic polymer (i) is melt-kneaded with (ii) a carboxyl group-containing polymer, water optionally together with a basic substance is added to the melt substantially filling a space portion between a screw and a barrel in an extruder and melt-kneading is further conducted, even if the water content is extremely low and 0.5 to 3% by weight based on the total mixture, the phase inversion is caused and there is obtained an aqueous dispersion in which water forms a continuous phase and the polymers form a dispersed phase of particles.

In order to form an aqueous dispersion in which a water forms a continuous phase and a resin forms a dispersed phase of particles, according to the above-mentioned conventional methods, it is necessary that the water content should be at least 3% by weight, generally 5 % by weight or higher, and if the water content is lower than this level, an aqueous dispersion cannot be formed. The reason is that in the conventional methods, since melt-kneading is carried out in the state where an outlet of a biaxial screw extruder is opened, no pressure is applied to the molten resin and the melt-kneaded resin is extruded without being substantially filled in a space portion between a screw and a barrel.

In the present invention, water is added in the state where a space portion between a screw and a barrel in an extruder is substantially filled with the melt of the resin composition and melt-kneading is further conducted, whereby the shearing force and kneading force between the screw and barrel are directly and effectively applied to the water-melt system, with the result that water is first dispersed in the melt and the phase inversion is then caused effectively. In the composition of the present invention, the carboxylic acid salt group of the thermoplastic polymer (ii) shows a strong affinity with water (iii), and the polymer chain of the thermoplastic polymer (ii) shows an affinity with the hydrophobic thermoplastic polymer (i). Accordingly, if the composition is kneaded under the melt-kneading conditions of the present invention, water is taken and dispersed in the resin by the carboxylic acid group of the thermoplastic polymer, and by the surface tension of the molten resin, the carboxylic acid salt group in the resin is oriented on the outer surface of the resin, and particles having water adhering in the form of a monomolecular film layer or a similar thin film layer to this oriented carboxylic acid salt group are thus formed.

According to the present invention, the phase inversion of resin solids to a solid aqueous dispersion is caused in the above-mentioned manner. When this solid aqueous dispersion is taken out, it is necessary that the solid aqueous solution should be taken out at a temperature lower than the boiling point of water, generally at 70 to 90° C. Since the temperature of the melt-kneaded mixture is considerably higher than the boiling point of water, if the formed solid aqueous dispersion is directly extruded, water is flashed out and the intended solid aqueous dispersion cannot be obtained. If a cooling device is disposed at the top end of the extruder and the aqueous dispersion is extruded after it is cooled below the boiling point of water by this cooling device, flashing of water is prevented and a solid aqueous dispersion can be stably obtained even if the water content is low. Furthermore, if the aqueous dispersion is cooled on the top end of the extruder, the flowability of the melt is reduced and the pressure is elevated to, for example, 5 to 20 kg/cm$^2$ gauge and the molten resin is substantially filled in the space portion between the barrel and screw. In accordance with the present invention, the aqueous dispersion is cooled on the top end of the extruder, whereby an effect of preventing flashing of water and an effect of substantially filling the melt in the space portion between the screw and barrel are simultaneously attained.

In the composition of the present invention, it is the thermoplastic polymer (ii) containing a carboxylic acid salt that exerts a main action of causing the phase inversion of the hydrophobic thermoplastic polymer to dispersed particles of the oil-in-water (O/W) type, and if at least one member (iv) selected from the group consisting of anionic surface active agents, nonionic surface active agents, organic solvents and oils is used according to need, this phase inversion action is further promoted, and by adjusting the water content to a level lower than in the conventional methods, that is, to 0.5 to 3% by weight, in the molten mixture of the respective components and water and carrying out melt-kneading under the above-mentioned conditions, the dispersed particle size of the resin solids can be made finer, that is, smaller than 0.5 μ.

Incidentally, in the present invention, the dispersed particle size is defined to be a size of particles of resin solids formed without any particular shearing or the like when water is added to the solid aqueous dispersion.

In the solid aqueous dispersion of the present invention, the fact that water is present as the continuous phase and the resin solids are present as the dispersed phase of independent fine particles even if the water content is as low as 3% by weight or less is confirmed from the fact that the electric resistance is lower than $10^6$ Ω-cm, generally lower than $10^5$ Ω-cm and when water is added to this solid aqueous dispersion, the solids are uniformly dispersed in the aqueous shape.

The present invention will now be described in detail.

Ingredients

The thermoplastic polymer (i) which is one of the ingredients constituting the solid aqueous dispersion of the present invention is a water-insoluble and non-water-swelling resin which has no water dispersibility and does not substantially contain a carboxyl group. For example, there can be mentioned polyolefins such as low density polyethylene, high density polyethylene, polypropylene, poly-butene-1, poly(4-methyl-1-pentene) and random and block copolymers of α-olefins such as ethylene, propylene, butene-1 and 4-methyl-1-pentene, ethylene/vinyl compound copolymers such as an ethylene/vinyl acetate copolymer, an ethylene/vinyl alcohol copolymer and an ethylene/vinyl chloride copolymer, styrene type resins such as polystyrene, an acrylonitrile/styrene copolymer, ABS and an α-methylstyrene/styrene copolymer, polyvinyl compounds such as polyvinyl chloride, polyvinylidene chloride, a vinyl chloride/vinylidene chloride copolymer, polymethyl methacrylate and polymethyl acrylate, polyamides such as nylon 6, nylon 6—6, nylon 6-10, nylon 11 and nylon 12, thermoplastic polyesters such as polyethylene terephthalate and polybutylene terephthalate, and polycarbonates and polyphenylene oxide. Mixtures of two or more of these polymers may be used.

Among these thermoplastic polymers, there are preferably used olefin resins, that is, homopolymers and copolymers of α-olefins such as ethylene, propylene, butene-1, 3-methyl-1-butene, 4-methyl-1-pentene, 3-methyl-1-pentene, 1-heptene, 1-hexene, 1-decene and 1-dodecene, represented by polyethylene, polypropylene, poly-1-butene, poly-3-methyl-1-butene, poly-4-methyl-1-pentene, poly-3-methyl-1-pentene, an ethylene/propylene copolymer, an ethylene/1-butene copolymer and a propylene/1-butene copolymer, copolymers of α-olefins with conjugated or non-conjugated dienes, represented by an ethylene/butadiene copolymer and an ethylene/ethylene norbornene copolymer, and copolymers of at least two α-olefins with conjugated or non-conjugated dienes, represented by an ethylene/propylene/butadiene terpolymer, an ethylene/propylene/dicyclopentadiene terpolymer, an ethylene/propylene/ethylidene norbornene terpolymer and an ethylene/propylene/1,5-hexadiene terpolymer. Homopolymers or copolymers of α-olefins are especially preferred.

The melt flow rate (MFR according to ASTM D-1238) of the thermoplastic polymer is at least 1 g/10 min, preferably at least 5 g/10 min. If MFR is lower than 1 g/10 min, the melt viscosity becomes too high and melt-kneading is difficult, and a preferred aqueous dispersion can hardly be obtained.

In accordance with one preferred embodiment of the present invention, an ethylene/propylene copolymer elastomer or an ethylene/propylene/diene terpolymer elastomer is used.

In accordance with another embodiment of the present invention, as described hereinafter, by using an anionic surface active agent and/or a nonionic surface active agent and an organic solvent in combination, it is possible to obtain a solid aqueous dispersion of a resin having a melt flow rate of substantially zero, that is, an ultra-high-molecular-weight olefin resin having a weight average molecular weight ($\overline{Mw}$) of at least 500,000.

The thermoplastic polymer (ii) as another constituent of the solid aqueous dispersion of the present invention is obtained by introducing a monomer having a neutralized or unneutralized carboxylic acid group or a monomer having a saponified or unsaponified carboxylic acid ester group into the above-mentioned thermoplastic polymer (i) or the constituent monomer thereof by such means as graft copolymerization, block copolymerization or random polymerization and, if necessary, performing neutralization or saponification with a basic substance, so that the content of the carboxylic acid salt formed in the polymer is 0.1 to 5 millimole equivalents, especially 0.2 to 4 millimole equivalents, as

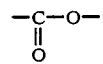

per gram of the polymer. The polymer may be a partially neutralized or saponified polymer in which a carboxylic acid group or carboxylic acid ester group is present. The thermoplastic polymer (ii) should be water-insoluble and non-water-swelling. If the content of the neutralized carboxylic acid group and/or the saponified carboxylic acid ester group is outside the above-mentioned range, the thermoplastic polymer (ii) does not exert the action of promoting dispersion of the thermoplastic polymer (i) and no good solid dispersion can be prepared. If the polymer (ii) is water-soluble or water-swelling, the physical properties of the coating are degraded.

When the thermoplastic polymer (ii) is obtained by post neutralization or post saponification, the starting polymer is a copolymer of the same monomer as the constituent monomer of the thermoplastic polymer (i) with an ethylenically unsaturated carboxylic acid or an ester thereof. As the unsaturated carboxylic acid, there can be mentioned acrylic acid, methacrylic acid, maleic acid, fumaric acid, tetrahydrophthalic acid, itaconic acid, citraconic acid, crotonic acid, isocrotonic acid, Nadic Acid ® (endo-cis-bicyclo(2,2,1)-hepto-5-ene-2,3-dicarboxylic acid), maleic anhydride and citraconic anhydride. As the unsaturated carboxylic acid ester, there can be mentioned methyl, ethyl and propyl monoesters and diesters of the above-mentioned carboxylic acids. Of course, as is obvious to persons with ordinary skill in the art, a thermoplastic polymer for post neutralization or post esterification can be obtained by adopting means of grafting the thermoplastic polymer (ii), for example, an olefin resin, with a monomer such as an ethylenically unsaturated carboxylic acid or an anhydride or ester thereof, instead of copolymerization of a plurality of monomers.

The amount of the ethylenically unsaturated carboxylic acid or the anhydride or ester thereof to be introduced into the monomer should be sufficient to provide the above-mentioned carboxylic acid salt concentration, and this amount is at least 0.1 millimole equivalent, preferably 0.1 to 5 millimole equivalents, as

per gram of the polymer.

As the basic substance to be used for neutralization or saponification, there can be mentioned substances acting as a base in water, such as alkali metals, alkaline earth metals, ammonia and amines substances acting as a base in water, such as oxides, hydroxides, weak acid salts and hydrides of alkali metals and oxides, hydroxides, weak acid salts and hydrides of alkaline earth metals, and alkoxides of these metals. Specific examples of these substances are described below.

(1) As the alkali metal, there can be mentioned, for example, sodium and potassium, and as the alkaline earth metal, there can be mentioned, for example, calcium, strontium and barium.

(2) As the amine, there can be mentioned inorganic amines such as hydroxylamine and hydrazine, and methylamine, ethylamine, ethanolamine and cyclohexylamine.

(3) As the oxide, hydroxide and hydride of the alkali metal and alkaline earth metal, there can be mentioned sodium oxide, sodium peroxide, potassium oxide, potassium peroxide, calcium oxide, strontium oxide, barium oxide, sodium hydroxide, potassium hydroxide, calcium hydroxide, strontium hydroxide, barium hydroxide, sodium hydride, potassium hydride and calcium hydride.

(4) As the weak acid salt of the alkali metal or alkaline earth metal, there can be mentioned sodium carbonate, potassium carbonate, sodium hydrogencarbonate, potassium hydrogencarbonate, calcium hydrogencarbonate, sodium acetate' potassium acetate and calcium acetate.

(5) As the ammonia and amine compounds, there can be mentioned ammonium hydroxide, quaternary ammonium compounds such as tetramethylammonium hydroxide, and hydrazine hydrate.

As the carboxylic acid group or carboxylic acid ester group neutralized or saponified with the basic substance, carboxylic acid alkali metal salts such as sodium carboxylates and potassium carboxylates, and ammonium carboxylates are preferred. Potassium carboxylates are especially preferred.

It is preferred that a polymer having a good affinity with the thermoplastic polymer (i) be used as the thermoplastic polymer (ii). Namely, when a solid aqueous dispersion of an olefin type resin is intended, a polymer containing an olefinic monomer in the main chain should be selected as the polymer (ii). For example, when a polyolefin such as polyethylene or an ethylene-/vinyl acetate copolymer is used, it is preferable to use a maleic acid-grafted product of such a polymer or a neutralized or saponified ethylene/(meth)-acrylic acid copolymer or ethylene/methyl (meth)acrylate copolymer. One parameter for selecting an appropriate thermoplastic polymer is a solubility parameter (SP value). Namely, it is preferred that the difference of the solubility between the starting polymer before the neutralization or saponification and the thermoplastic polymer (i) be up to 2 (cal/cm$^3$)$^{\frac{1}{2}}$, especially up to 1 (cal/cm$^3$)$^{\frac{1}{2}}$.

In the instant specification, the solubility parameter is defined to have an ordinary meaning, that is, the square root of the cohesive energy. This solubility parameter is calculated according to the following formula disclosed in D. W. Van Klevelen, "Properties of Polymers" (Elsevier, 1972) by using the value Vi of contribution of the atomic group to the molar volume and the cohesive energy En of the atomic group:

$$SP = \left( \frac{\Sigma Eni}{\Sigma Vi} \right) (cal/cm^3)^{\frac{1}{2}}$$

As the anionic surface active agent (iv-a) used as the optional component, there can be used any of anionic surface active agents formed by reaction with basic substances, such as primary higher fatty acid salts, secondary higher fatty acid salts, primary higher alcohol sulfate ester salts, secondary higher alcohol sulfate ester salts, primary higher alkyl sulfonate salts, secondary higher alkyl sulfonate salts, higher alkyl disulfonate salts, sulfonated higher fatty acid salts, higher fatty acid sulfate ester salts, higher fatty acid sulfonate ester salts, higher alcohol ether sulfate ester salts, higher alcohol ether sulfonate salts, alkylolated sulfate ester salts of higher fatty acid amides, alkyl benzene-sulfonate salts, alkylphenol sulfate salts, alkyl naphthalene-sulfonate salts and alkyl benzimidazole sulfonate salts. Specific compound names of these surface active agents are disclosed, for example, in Hiroshi Horiguchi, "Synthetic Surface Active Agents" (Sankyo Shuppan, 1966). Alkali metals salts of higher fatty acids, especially saturated and unsaturated higher fatty acids, are preferred. More specifically, there can be mentioned alkali metal salts of saturated fatty acids such as capric acid, undecanoic acid, lauric acid, myristic acid, palmitic acid, margaric acid, stearic acid and arachidic acid, unsaturated fatty acids such as linderic acid, tsuzuic acid, petroselinic acid, oleic acid, linolic acid, linoleic acid and arachidonic acid, and mixtures thereof.

As the nonionic surface active agent used as the optional component (iv-b), nonionic surface active agents having an HLB value of at least 10, preferably at least 13, are mentioned. The nonionic surface active agents may be used singly or in the form of mixtures of two or more of them. In case of a mixture, it is sufficient if the HLB value of the mixture is in the above-mentioned range. For example, there can be used polyoxyethylene alkyl ethers, polyoxyethylene alkylphenyl ethers, polyoxyethylene fatty acid esters, polyoxyethylene fatty acid amide ethers, polyhydric alcohol fatty acid esters, polyoxyethylene polyhydric alcohol fatty acid esters, fatty acid sucrose esters, alkylolamides and polyoxyalkylene block copolymers, which have an HLB value included within the above-mentioned range. In these nonionic surface active agents, increase of the content of polyoxyethylene units generally results in increase of the HLB value. Accordingly, a nonionic surface active agent having a desired HLB value can be obtained by adjusting the number of added moles of ethylene oxide.

Any of organic solvents capable of dissolving (swelling) the thermoplastic polymer (i) and the thermoplastic polymer (ii) can be used as the organic solvent as the optional component (iv-c). For example, there can be mentioned aromatic hydrocarbons such as benzene, toluene, xylene, styrene, α-methylstyrene and divinylbenzene, aliphatic hydrocarbons such as hexane and heptane, and halogenated hydrocarbons such as trichloroethylene. The organic solvent may be contained in the final solid aqueous dispersion or may be removed from the final solid aqueous dispersion by distillation or azeotropic distillation. For example, in the case where the organic solvent is removed by distillation, it is preferred that the boiling point of the organic solvent be lower than 100° C.

This organic solvent swells or partially dissolves the thermoplastic polymer (i), and the amount of the organic solvent may be much smaller than the amount used in the conventional solvent method.

As the natural or synthetic oil used as the optional component (iv-d), there can be mentioned mineral lubricating oils such as spindle oil and machine oil, mineral oils such as liquid paraffin, electrically insulating oil and process oil, synthetic oils such as alkylbenzene oil, diolefin oil, diester oil and alkyl naphthenate oil, and plant oils such as castor oil, linseed oil, rapeseed oil, coconut oil and tall oil. In order to maintain the oil stably in the resin solids, it is indispensable that the oil should have a number average molecular weight of at least 200.

Composition and Preparation of Solid Aqueous Dispersion

It is preferred that the ratio between the above-mentioned thermoplastic polymers (i) and (ii) be such that the amount of the thermoplastic polymer (ii) is 1 to 60 parts by weight, especially 2 to 50 parts by weight, per 100 parts by weight of the thermoplastic polymer (i). If the amount of the thermoplastic polymer (ii) is too small and below the above-mentioned range, dispersion of the thermoplastic polymer (i) is insufficient, and if the amount of the polymer (ii) is too large and exceeds the above-mentioned range, a dispersion having properties different from the properties of the intended dispersion of the thermoplastic polymer (i) is formed.

The solid aqueous dispersion of the present mentioned ingredients. The water content is 0.5 to 3% by weight, preferably 1.0 to 2.5% by weight. Of course, an additional amount of water may be added to the solid aqueous dispersion of the present invention. It must be noted that even in this case, the phase inversion to the solid aqueous dispersion is effect with the above-mentioned small amount of water.

The solid aqueous dispersion of the present invention comprises the above-mentioned three ingredients as indispensable ingredients. If desired, at least one member selected from the group consisting of anionic surface active agents, nonionic surface active agents, organic solvents and oils may be added at the time of the preparation.

The anionic surface active agent (iv-a) and/or the nonionic surface active agent (iv-b) is incorporated in an amount of 0.1 to 40 parts by weight, especially 0.2 to 20 parts by weight, per 100 parts by weight of the organic polymer (i). The organic solvent (iv-c) is incorporated in an amount of 10 to 1000 parts by weight, especially 20 to 700 parts by weight, per 100 parts by weight of the polymer (i). The oil (iv-d) is made present in an amount of 10 to 500 parts by weight, especially 20 to 300 parts by weight, per 100 parts by weight of the polymer (i).

In the case where a thermoplastic polymer (ii) or anionic surface active agent precursor requiring the base treatment is contained, a basic substance (v) necessary for the reaction is incorporated.

Referring to FIG. 1 illustrating an apparatus preferably used in carrying out the process of the present invention, an extruder 1 comprises a barrel 2 and biaxial screws 3a and 3b arranged in the barrel 2. A hopper 4 for supplying the thermoplastic polymers (i) and (ii) optionally together with the surface active agent is arranged on one end of the extruder 1, and supply openings for supplying water or an aqueous solution of a basic substance and the surface active agent (liquid) or the oil is arranged in the midway of the extruder 1. Furthermore, a cooling device 7 is arranged on the other end of the extruder 1, that is, an extruder opening. The cooling device may be a static mixer provided with a jacket for circulating a cooling medium.

In preparing the solid aqueous dispersion of the present invention, at first, the hydrophobic thermoplastic polymer (i) and the carboxylic acid derivative group-containing thermoplastic polymer (ii), optionally together with the anionic surface active agent, the nonionic surface active agent (if the surface active agent is liquid it is supplied from the opening 5), are supplied from the hopper 4, and these ingredients are melt-kneaded. The melt-kneading temperature is higher than the melting point of the polymer having a higher melting point, and preferably lower than the temperature at which the melt viscosity is lower than $10^6$ poise, especially lower than $10^5$ poise. In the case where the ingredient (iv-c) or (iv-d) is used, the melt-kneading temperature need not be higher than the melting point of the resin, but it is sufficient if the viscosity of the composition is in the above-mentioned range.

Water or the aqueous solution of the basic substance is supplied to the melt present in the space portion filled with the melt between the barrel 2 and the screws 3a and 3b in the extruder 1. Whether or not the melt is substantially filled in the space portion between the barrel 2 and the screws 3a and 3b can be confirmed by measuring the back pressure imposed on the melt present in the space portion. If this back pressure is within the range of 0.5 to 300 kg/cm$^2$G, preferably 1.0 to 200 kg/cm$^2$G, it is judged that the space portion is substantially filled with the resin melt, though this back pressure is changed according to the flow characteristics of the resin melt or the melt-kneading temperature. Incidentally, the term "the back pressure" means the pressure imposed on the melt by supplying water or the aqueous solution.

Furthermore, in the case where the space portion between the barrel 2 and the screws 3a and 3b, to which water is supplied, is filled with the melt, the power of the extruder per the extrusion quantity of the resin is increased and the specific energy is higher than 0.3 kW·hr/kg. In the instant specification, the specific energy is defined to be a value obtained by dividing the power consumption of a motor of a continuous kneading device by an amount of the resin extruded for a predetermined time.

As means for substantially filling the resin melt in the space portion between the barrel and the screw in the water-supplying portion, there may be adopted the method in which the cooling device 7 is arranged on the top end of the extruder and the method in which a screen pack or the like is attached to the top end of the extruder to produce the above-mentioned resin pressure. In short, any means can be adopted, so far as the back pressure on the melt in the water-supplying portion is within the above-mentioned range.

After addition of water or the aqueous solution of the basic substance, melt-kneading of the mixture is conducted to effect the phase inversion to an aqueous dispersion. The formed aqueous dispersion is cooled to a temperature lower than the boiling point of water by the cooling device and is taken out in the form of a stable solid aqueous dispersion. Incidentally, cooling is necessary only when the aqueous dispersion is taken out from the system, and if the aqueous dispersion is not taken out from the system but is directly used for a post treatment, a chemical reaction or the like, cooling is not necessary.

Of course, an additional amount of water may be added to the obtained solid aqueous dispersion.

The so-prepared aqueous dispersion is then cooled naturally or artificially to room temperature. At this cooling, the dispersed particles are solidified to form a stable solid aqueous dispersion. When the solvent is used, the solvent may be removed by such means as distillation, if necessary.

When this solid aqueous dispersion or water-added dispersion is prepared, there may be used subsidiary materials customarily used for aqueous dispersions, for example, dispersants such as anionic and nonionic surface active agents, emulsifiers, stabilizers, swelling agents, tackifiers, bubbling agents, defoaming agents, coagulants, gelling agents, anti-aging agents, softeners, plasticizers, fillers, colorants, perfumes, sticking-preventing agents and parting agents.

Aqueous Dispersion

Although the aqueous dispersion of the present invention is apparently solid, it has an oil-in-water type dispersion structure in which water forms the continuous phase and the resin forms the dispersed particles. From an electron microscope photograph of this solid aqueous dispersion, it is seen that secondary particles of the solid aqueous dispersion of the present invention comprise slightly deformed fine primary particles which are considerably densely agglomerated. By various facts described below, it is proved that the primary particles have the oil-in-water dispersion form.

One characteristic property of the solid aqueous dispersion of the present invention is an electric resistance lower than $10^6$ $\Omega$-cm, generally lower than $10^5$ $\Omega$-cm. It is presumed that this low electric resistance is due to the fact that the continuous phase of the dispersion is composed of water and the discontinuous phase is composed of the resin. In case of a dispersion in which the continuous phase is composed of a resin, or a resin powder containing up to 3% by weight of water, the electric resistance is the inherent value of the resin (generally on the order of $10^{10}$ $\Omega$-cm).

Incidentally, the electric resistance referred to herein is one measured according to the following method. Namely, electrodes of 1 cm are attached to confronting inner side of a cubic vessel having a side of 1 cm. The dispersion is pressed into the vessel, and the resistance between the two electrodes is measured at 60 Hz by an alternating current resistance-measuring device.

The state of the dispersion formed by addition of water is determined by throwing the solid aqueous dispersion into cold water, stirring the mixture by an ordinary stirrer having turbine vanes and filtering the resulting dispersion through a net of about 100 mesh and by observing the particles in the resulting dispersion by a microscope.

When the solid aqueous dispersion of water is dispersed in water by addition of water, it takes the form of substantially spherical particles and the average particle size is smaller than 0.5 $\mu$. The particle size can be measured by using a micro-track.

The solid aqueous dispersion of the present invention has an extremely low water content and is apparently solid, and if water is added, the solid dispersion is easily converted to a flowable aqueous dispersion. Furthermore, the solid aqueous dispersion or the present invention is characterized in that there is no fear of freezing, the storage space can be saved and transportation or packaging is facilitated. Moreover, the solid aqueous dispersion of the present invention can be directly incorporated into a powder or granule which dislikes the contact with water, such as cement, mortar or gypsum. The flowable aqueous dispersion formed by addition of water can be used for forming a water-resistant, oil-resistant and chemical-resistant film on various materials or can be used as a heat-sealing material. According to another application embodiment of the present invention, by applying a very small shearing force to the solid aqueous solution of the present invention or drying the solid aqueous dispersion under very mild temperature conditions, the solid aqueous dispersion can be finely divided or the water content can be reduced. Furthermore, the solid aqueous dispersion of the present invention can be used as a binder for new ceramics or as a polymer modifier.

The present invention will now be described in detail with reference to the following examples that by no means limit the scope of the invention. Incidentally, in the examples, all of "parts" and "%" are by weight unless otherwise indicated.

EXAMPLE 1

From a hopper of a unidirection rotation engagement type biaxial screw extruder (Model PCM-30 supplied by Ikegai Tekko, L/D=20) as shown in FIG. 1, a mixture of 100 parts of low density polyethylene (density=0.915 g/cm$^3$, MFR=70 g/10 min, SP value=7.80 (cal/cm$^3$)$^{\frac{1}{2}}$) as the thermoplastic polymer (i), 10 parts of maleic anhydride-grafted polyethylene (maleic anhydride content =3.3%, —C))—group concentration=0.67 millimole equivalents/g of polymer, density=0.94 g/cm$^3$, SP value =8.06 (cal/cm$^3$)$^{\frac{1}{2}}$) as the thermoplastic polymer (ii) and 2 parts of oleic acid as the substance capable of forming an anionic surface active agent by reaction with a basic substance at a rate of 112 parts per hour, and a 23% aqueous solution of potassium hydroxide was continuously supplied at a rate of 3.5 parts per hour from a supply opening formed in the intermediate portion of the extruder and the mixture was continuously extruded at a heating temperature of 160° C. The extruded resin mixture was cooled to 90° C. by a jacket-provided static mixer arranged at the outlet of the extruder and was taken out. The recovered product was a white solid. The back pressure at the time of the supply of the aqueous solution was 6.0 kg/cm$^2$G and the pressure on the top end of the extruder screw was 10.0 kg/cm$^2$G. The specific energy calculated from the extrusion quantity and power consumption was 0.32 kW·hr/kg. When the white solid was packed in a cubic vessel having a side of 1 cm and the electric resistance was measured, it was found that the electric resistance was 8×10$^3$ $\Omega$-cm. When the solid was dispersed in water and the dispersion was observed by a microscope, it was found that spherical fine particles were dispersed. When the size of the dispersed particles was measured by a micro-track, it was found that the average particle size was 0.45 μ.

EXAMPLE 2

From the hopper of the same unidirection rotation engagement type biaxial screw extruder as used in Example 1, a mixture comprising 100 parts of an ethylene/vinyl acetate copolymer resin (vinyl acetate content=19%, density=0.97 g/cm$^3$, MFR=150 g/10 min SP value=8.06 (cal/cm$^3$)$^{\frac{1}{2}}$ as the thermoplastic polymer (i), 10 parts of the same maleic anhydride-grafted polyethylene as used in Example 1 as the thermoplastic polymer (ii) and 3 parts of potassium oleate as the anionic surface active agent was supplied at a rate of 113 parts per hour, and a 13% aqueous solution of potassium hydroxide was continuously supplied at a rate of 2.9 parts per hour from the supply opening formed in the intermediate portion of the extruder and the mixture was continuously extruded at a heating temperature of 140° C. The extruded mixture was cooled to 90° C. by a jacket-provided static mixer arranged at the outlet of the extruder and was taken out. The recovered product was a white solid. The back pressure at the supply of the aqueous solution was 5.0 kg/cm$^2$G and the pressure on the top end of the extruder screw was 8.0 kg/cm$^2$G. The specific energy calculated from the extrusion quantity and powder consumption was 0.31 kW·hr/kg. The electric resistance measured in the same manner as described in Example 1 was 8×10$^3$ Ω-cm. When the solid was dispersed in water and the dispersion was observed by a microscope, it was found that spherical fine particles were dispersed. When the size of the dispersed particles was measured by a microtrack, it was found that the average particle size was 0.48 μ.

Referential Example 1

An atmospheric pressure type kneader was charged with 100 parts of the same maleic anhydride-grafted polyethylene as used in Example 1 and the resin was melt-kneaded at 140° C. Then, 40 parts of an aqueous alkali solution containing 3.76 parts of potassium hydroxide (1.0 chemical equivalent to the —COO— group) dissolved therein was gradually dropped, and after evaporation of water, the resin was further kneaded for 30 minutes and was then cooled.

EXAMPLE 3

From the hopper of the same unidirection rotation engagement type biaxial screw extruder as used in Example 1, a mixture comprising 100 parts of an ethylene/propylene terpolymer (ethylene content=65 mole%, density=0.87 g/cm$^3$, MFR=0.4 g/10 min, SP value=8.03 (cal/cm$^3$)$^{\frac{1}{2}}$) as the thermoplastic polymer (i), 10 parts of the alkali salt of the thermoplastic polymer (ii) obtained in Referential Example 1 and 3 parts of potassium oleate as the anionic surface active agent was supplied at a rate of 113 parts per hour, and distilled water was continuously supplied at a rate of 1.2 parts per hour from the supply opening formed in the intermediate portion of the extruder and the mixture was continuously extruded at a heating temperature of 200° C. The extruded mixture was cooled to 90° C. by a jacket-provided static mixer arranged at the outlet of the extruder and was taken out. The recovered product was a white solid. The back pressure at the supply of distilled water was 20.0 kg/cm$^2$G and the pressure on the top end of the extruder screw was 20.0 kg/cm$^2$G. The specific energy calculated from the extrusion quantity and power consumption was 0.39 kW·hr/kg. The electric resistance determined in the same manner as described in Example 1 was 8×10$^4$ Ω-cm. When the solid was dispersed in water and the dispersion was observed by a microscope, it was found that spherical fine particles were dispersed. When the size of the dispersed particles was measured by a micro-track, it was found that the average particle size was 0.37 μ.

EXAMPLE 4

From the hopper of the same unidirection rotation engagement type biaxial screw extruder as used in Example 1, a mixture comprising 100 parts of the same ethylene/vinyl acetate copolymer resin as used in Example 2 as the thermoplastic polymer (i), and 10 parts of the same maleic anhydride-grafted polyethylene as used in Example 1 and 10 parts of an ethylene/acrylic acid copolymer resin (A-C polyethylene 5120 supplied by Allied Chemical, acrylic acid content=15%, —COO— group concentration=2.14 millimole equivalents/g of polymer, viscosity (140° C.)=650 cps, density=0.93 g/cm$^3$, SP value=8.58 (cal/cm$^3$)$^{\frac{1}{2}}$) as the thermoplastic polymer (ii) was supplied at a rate of 120 parts per hour, and a 35% aqueous solution of potassium hydroxide was continuously supplied at a rate of 4.5 parts per hour from the supply opening formed in the intermediate portion of the extruder and the mixture was continuously extruded at a heating temperature of 160° C. The extruded resin mixture was cooled to 90° C. by a jacket-provided static mixer arranged at the outlet of the extruder and was taken out. The recovered product was a white solid. The back pressure at the supply of the aqueous solution was 7.0 kg/cm$^2$G and the pressure on the top end of the extruder screw was 10.0 kg/cm$^2$G. The specific energy calculated from the extrusion quantity and power consumption was 0 33 kW·hr/kg. The electric resistance of the solid measured according to the same method as described in Example 1 was 9×10$^3$ Ω-cm. When the solid was dispersed in water and the dispersion was observed by a microscope, it was found that spherical fine particles were dispersed. When the size of the dispersed particles was measured by a microtrack, it was found that the average particle size was 0.47 μ.

EXAMPLE 5

From the hopper of the same unidirection rotation engagement type biaxial screw extruder as used in Example 1, a mixture comprising 100 parts of the same ethylene/propylene terpolymer as used in Example 3 as the thermoplastic polymer (i) and 10 parts of the same maleic anhydride-grafted polyethylene as used in Example 1 as the thermoplastic polymer (ii) was supplied at a rate of 110 parts per hour, and oleic acid as the substance forming an anionic surface active agent by reaction with a basic substance was continuously supplied at a rate of 2 parts per hour from a supply opening arranged in a portion between the hopper and vent of the extruder and a 23% aqueous solution of potassium hydroxide was continuously supplied at a rate of 3.5 parts per hour from a supply opening formed in a portion intermediate between the vent and top end of the extruder. The mixture was continuously extruded at a heating temperature of 140° C. The extruded resin mixture was cooled to 90° C. by a jacket-provided static mixer and was taken out. The recovered product was a white solid. The back pressure at the supply of the aqueous solution was 5.0 kg/cm$^2$G and the pressure on the top end of the extruder screw was 8.0 kg/cm$^2$G. The specific energy calculated from the extrusion quantity and power consumption was 0.38 kW·hr/kg. The electric resistance of the solid measured in the same manner as described in Example 1 was $8 \times 10^3$ Ω-cm. When the solid was dispersed in water and the dispersion was observed by a microscope, it was found that spherical fine particles were dispersed. When the size of the dispersed particles was measured by a micro-track, it was found that the average particle size was 0.48 μ.

EXAMPLE 6

From the hopper of the same unidirection rotation engagement type biaxial screw extruder as used in Example 1, a mixture comprising 100 parts of the low density polyethylene as used in Example 1 as the thermoplastic polymer (i), 10 parts of the same maleic anhydride-grafted polyethylene as used in Example 1 as the thermoplastic polymer (ii) and 5 parts of Emulgen 430 (supplied by Kao) as the nonionic surface active agent was supplied at a rate of 115 parts per hour, and a 17% aqueous solution of potassium hydroxide was continuously supplied at a rate of 2.3 parts per hour from a supply opening formed in the intermediate portion of the extruder and the mixture was continuously extruded at a heating temperature of 160° C. The extruded resin mixture was cooled to 90° C. by a jacket-provided static mixer arranged at the outlet of the extruder and was taken out. The recovered product was a white solid. The back pressure at the supply of the aqueous solution was 6.0 kg/cm$^2$G and the pressure on the top end of the extruder was 10.0 kg/cm$^2$G. The specific energy calculated from the extrusion quantity and power consumption was 0.35 kW·hr/kg. The electric resistance of the solid measured in the same manner as described in Example 1 was $9 \times 10^3$ Ω-cm. When the solid was dispersed in water and the dispersion was observed by a microscope, it was found that spherical fine particles were dispersed. When the size of the dispersed particles was measured by a micro-track, it was found that the average particle size was 0.40 μ.

EXAMPLE 7

From the hopper of the same unidirection rotation engagement type biaxial screw extruder, a mixture comprising 100 parts of the same low density polyethylene as used in Example 1 as the thermoplastic polymer (i), 10 parts of the alkali salt of the polymer obtained in Referential Example 1 a the thermoplastic polymer (ii) and 10 parts of Emulgen 430 (supplied by Kao) was supplied at a rate of 120 parts per hour, and distilled water was continuously supplied at a rate of 2.7 parts per hour from a supply opening formed in the intermediate portion of the extruder and the mixture was continuously extruded at a heating temperature of 160° C. The extruded resin mixture was cooled to 90° C. by a jacket-provided static mixer arranged at the outlet of the extruder and was taken out. The recovered product was a white solid. The back pressure at the supply of water was 13.5 kg/cm$^2$G and the pressure on the top end of the extruder screw was 12.5 kg/cm$^2$G. The specific energy calculated from the extrusion quantity and power consumption was 0.34 kW·hr/kg. The electric resistance of the solid measured in the same manner as described in Example 1 was $1 \times 10^4$ Ω-cm. When the solid was dispersed in water and the dispersion was observed by a microscope, it was found that spherical fine particles were dispersed. When the size of the dispersed particles was measured by a micro-track, it was found that the average particle size was 0.43 μ.

EXAMPLE 8

From the hopper of the same unidirection rotation engagement type biaxial screw extruder as used in Example 1, a mixture comprising 100 parts of the same ethylene/propylene terpolymer as used in Example 3 as the thermoplastic polymer (i), 10 parts of the same maleic anhydride-modified polyethylene as used in Example 1 as the thermoplastic polymer (ii) and 2 parts of potassium oleate as the anionic surface active agent was supplied at a rate of 112 parts per hour, and perchloroethylene as the organic solvent was supplied at a rate of 10 parts per hour from a supply opening arranged in a portion intermediate between the hopper and vent of the extruder and a 18% aqueous solution of potassium hydroxide was continuously supplied at a rate of 2.2 parts per hour from a supply opening formed in a portion intermediate between the vent and top end of the extruder. The mixture was continuously extruded at a heating temperature of 200° C. The extruded resin mixture was cooled to 90° C. by a jacket-provided static mixer arranged at the outlet of the extruder and was taken out. The recovered product was a white solid. The back pressure at the supply of the aqueous solution was 12.0 kg/cm$^2$G and the pressure on the top end of the extruder screw was 12.5 kg/cm$^2$G. The specific energy calculated from the extrusion quantity and power consumption was 0.32 kW·hr/kg. The electric resistance of the solid measured in the same manner as described in Example 1 was $9 \times 10^3$ Ω-cm. When the solid was dispersed in water and the dispersion was observed by a microscope, it was found that spherical fine particles were dispersed. When the size of the dispersed particles was measured by a micro-track, it was found that the average particle size was 0.30 μ.

COMPARATIVE EXAMPLE 1

The procedures of Example 1 were repeated in the same manner except that the concentration of the aqueous solution of potassium hydroxide supplied from the intermediate portion was changed to 8% and the supply rate of the aqueous solution was changed to 10 parts by weight per hour. The recovered product was a white solid, and the electric resistance of the solid measured in the same manner as described in Example 1 was $2 \times 10^3$ Ω-cm. The back pressure at the supply of the aqueous solution was 6.0 kg/cm$^2$G and the pressure on the top end of the extruder screw was 8.0 kg/cm$^2$G. When the solid was dispersed in water and the dispersion was observed by a microscope, it was found that spherical fine particles were dispersed. When the size of the dispersed particles was measured by a micro-track, it was found that the average particle size was 1.21 μ.

EXAMPLE 9

From the hopper of the same unidirection rotation engagement type biaxial screw extruder as used in Example 1, a mixture comprising 100 parts of a styrene/ethylene/butylene/styrene copolymer (Kraton G-1657 supplied by Shell, density=0.90 g/cm$^3$, SP value=8.33 (cal/cm$^3$)$^{\frac{1}{2}}$) as the thermoplastic polymer (i), 10 parts of maleic anhydride-grafted polyethylene (maleic anhydride content=3.3%, —COO— group concentration=0.67 millimole equivalent/g of polymer, density=0.94 g/cm$^3$ and SP value=8.06 (cal/cm$^3$)$^{\frac{1}{2}}$) as the thermoplastic polymer (ii) and 2 parts of potassium oleate as the organic substance forming an anionic surface active agent by reaction with a basic substance was supplied at a rate of 112 parts per hour, and a 19% aqueous solution of potassium hydroxide was continuous supplied at a rate of 3.0 parts per hour from a supply opening (feed pump) formed in the intermediate portion of the extruder and the mixture was continuously extruder at a heating temperature of 200° C. The back pressure at the supply of the aqueous solution was 14.0 kg/cm$^2$G and the pressure on the top end extruder screw was 12.5 kg/cmG. The extruded resin mixture was cooled to 90° C. by a jacket-provided static mixer arranged at the outlet of the extruder and was taken out. The recovered product was a white solid. The specific energy calculated from the extrusion quantity and power consumption was 0.35 kW·hr/kg. The electric resistance of the solid measured in the same manner as described in Example 1 was $5\times10^3$ Ω-cm. When the solid was dispersed in water and the dispersion was observed by a microscope, it was found that spherical fine particles were dispersed. When the size of the dispersed particles was measured by a micro-track, it was found that the average particle size was 0.45 μ.

We claim:

1. An aqueous dispersion comprising (i) a hydrophobic thermoplastic polymer selected from the group consisting of polyolefins, ethylene/vinyl compound copolymers, styrene resins, polyvinyl chloride, polyvinylidene chloride, vinyl chloride-vinylidene chloride copolymer, polymethylacrylate, polymethylmethacrylate, polyamides, thermoplastic polyesters, polycarbonates and polyphenyleneoxide, (ii) a water-insoluble and non-water swelling thermoplastic polymer containing at least one of a neutralizable or saponifiable carboxylic acid or its anhydride or ester group bonded to the polymer chain at a concentration of 0.1 to 5 millimole equivalents as —COO— per gram of the polymer and having a good compatibility with the thermoplastic resin (i), or at least one of a neutralized or saponified product of said water-insoluble and non-water swelling thermoplastic polymer, (iii) water, said aqueous dispersion being apparently solid and having a water content of not less than 0.5 but less than 3% by weight and an electric resistance lower than 10$^6$ Ω-cm and also having such a property that when water is added to the dispersion, solids are uniformly dispersed as fine particles in the aqueous phase.

2. An aqueous dispersion as set forth in claim 1, wherein the size of fine particles dispersed by addition of water is smaller than 0.5 μ.

3. An aqueous solution as set forth in claim 1, wherein the thermoplastic polymer (i) is a homopolymer or copolymer of an α-olefin.

4. An aqueous dispersion as set forth in claim 1, wherein the thermoplastic polymer (i) is an ethylene/vinyl compound copolymer.

5. An aqueous dispersion as set forth in claim 1, wherein the thermoplastic polymer (i) is an ethylene/propylene copolymer elastomer or an ethylene/propylene/diene terpolymer elastomer.

6. An aqueous dispersion as set forth in claim 1, wherein the thermoplastic polymer (i) has a melt flow rate (ASTM D-1238) of at least 1 g/10 min.

7. An aqueous dispersion as set forth in claim 1, wherein the thermoplastic polymer (i) is an ultra-high-molecular-weight olefin resin having a weight average molecular weight ($\overline{Mw}$) of at least 500,000.

8. An aqueous dispersion as set forth in claim 1, wherein the thermoplastic polymer (ii) is a copolymer comprising main units of the same monomer as the monomer constituting the thermoplastic polymer (i) and units of a salt of an ethylenically unsaturated carboxylic acid.

9. An aqueous dispersion as set forth in claim 1, wherein the thermoplastic polymer (ii) is a salt of a copolymer of an α-olefin and an ethylenically unsaturated carboxylic acid.

10. An aqueous dispersion as set forth in claim 1, wherein the difference of the solubility parameter between the thermoplastic polymer (i) and the thermoplastic polymer (ii) before neutralization is up to 2 (cal/cm$^3$)$^{\frac{1}{2}}$.

11. An aqueous dispersion as set forth in claim 1, wherein the thermoplastic polymer (ii) is present in an amount of 1 to 60 parts by weight per 100 parts by weight of the thermoplastic polymer (i).

12. An aqueous dispersion as set forth in claim 1, wherein water is present in an amount of 1.0 to 2.5% by weight.

13. An aqueous dispersion as set forth in claim 1 wherein the thermoplastic polymer (ii) comprises maleic anhydride-grafted polyethylene.

14. An aqueous dispersion as set forth in claim 1 which further comprises an anionic surface active agent, a nonionic surface active agent or a mixture thereof.

15. An aqueous dispersion as set forth in claim 1 which further comprises an organic solvent.

16. An aqueous dispersion as set forth in claim 1 which further comprises an oil.

17. An aqueous dispersion as set forth in claim 14, wherein the anionic surface active agent, nonionic surface active agent or mixture thereof is present in an amount of 0.1 to 40 parts by weight per 100 parts by weight of the thermoplastic polymer (i).

18. An aqueous dispersion as set forth in claim 15, wherein the organic solvent is present in an amount of 10 to 1000 parts by weight per 100 parts by weight of the thermoplastic polymer (i).

19. An aqueous dispersion as set forth in claim 16, wherein the oil is present in an amount of 10 to 500 parts by weight per 100 parts by weight of the thermoplastic polymer (i).

20. An aqueous dispersion as set forth in claim 1, wherein the electric resistance of the aqueous dispersion is lower than 10$^5$ Ω-cm.

* * * * *